United States Patent
Yamaguchi et al.

(10) Patent No.: US 11,314,471 B2
(45) Date of Patent: Apr. 26, 2022

(54) PREVENTING PRINT DATA FROM BEING TRANSMITTED WHEN PRINTER IS IN A BUSY STATE

(71) Applicant: FUJIFILM BUSINESS INNOVATION CORP., Tokyo (JP)

(72) Inventors: Hiroshi Yamaguchi, Tokyo (JP); Masahiro Oizumi, Tokyo (JP); Keita Sakakura, Tokyo (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 37 days.

(21) Appl. No.: 16/159,728

(22) Filed: Oct. 15, 2018

(65) Prior Publication Data

US 2019/0278532 A1    Sep. 12, 2019

(30) Foreign Application Priority Data

Mar. 9, 2018    (JP) .............................. JP2018-043480
Mar. 9, 2018    (JP) .............................. JP2018-043481

(51) Int. Cl.
*G06F 3/12*    (2006.01)

(52) U.S. Cl.
CPC ............ *G06F 3/126* (2013.01); *G06F 3/1207* (2013.01); *G06F 3/1221* (2013.01); *G06F 3/1259* (2013.01); *G06F 3/1288* (2013.01); *G06F 3/1292* (2013.01)

(58) Field of Classification Search
CPC ...... G06F 3/126; G06F 3/1207; G06F 3/1259; G06F 3/1267
See application file for complete search history.

(56) References Cited

U.S. PATENT DOCUMENTS

| | | | |
|---|---|---|---|
| 4,958,298 A | * | 9/1990 | Okamoto ............... G06K 15/00 358/1.14 |
| 6,476,927 B1 | | 11/2002 | Schwarz, Jr. |
| 8,259,318 B2 | | 9/2012 | Miyajima |
| 8,446,609 B2 | | 5/2013 | Moriwaki |
| 8,621,467 B2 | | 12/2013 | Takahashi et al. |

(Continued)

FOREIGN PATENT DOCUMENTS

| | | |
|---|---|---|
| JP | 09-030080 A | 2/1997 |
| JP | 2002-501247 A | 1/2002 |

(Continued)

OTHER PUBLICATIONS

Japanese Office Action dated Feb. 22, 2022 for Japanese Patent Application No. 2018-043481.

(Continued)

*Primary Examiner* — Eric A. Rust
(74) *Attorney, Agent, or Firm* — Volpe Koenig

(57) ABSTRACT

A printing controller apparatus includes a transmitting unit, a receiving unit, and a controller. The transmitting unit performs transmission of first printing information to a printer. The receiving unit receives state information indicating a state of the printer. The controller performs control of the transmitting unit to prohibit the transmission of the first printing information to the printer if the state information indicates a state in which second printing information different from the first printing information is currently being printed or a state in which the second printing information is to be printed.

4 Claims, 13 Drawing Sheets

(56) References Cited

U.S. PATENT DOCUMENTS

| | | | |
|---|---|---|---|
| 9,794,446 B2 | 10/2017 | Nishida et al. | |
| 10,404,889 B2 | 9/2019 | Miyamoto et al. | |
| 2005/0267797 A1* | 12/2005 | Takahashi | G06F 3/1229 |
| | | | 718/102 |
| 2006/0044607 A1* | 3/2006 | Kato | G06F 3/1288 |
| | | | 358/1.15 |
| 2007/0223030 A1 | 9/2007 | Miyajima | |
| 2010/0211513 A1 | 8/2010 | Yoshida | |
| 2017/0070642 A1 | 3/2017 | Miyamoto et al. | |

FOREIGN PATENT DOCUMENTS

| | | |
|---|---|---|
| JP | 2005311884 | 11/2005 |
| JP | 2005-346180 A | 12/2005 |
| JP | 2007-266698 A | 10/2007 |
| JP | 2007-318485 A | 12/2007 |
| JP | 2010-191254 A | 9/2010 |
| JP | 2010199838 | 9/2010 |
| JP | 2012-234478 A | 11/2012 |
| JP | 2013-014109 A | 1/2013 |
| JP | 2013-119241 A | 6/2013 |
| JP | 2015-215854 A | 12/2015 |
| JP | 2016-009228 A | 1/2016 |
| JP | 2017-151752 A | 8/2017 |
| JP | 2017159618 | 9/2017 |

OTHER PUBLICATIONS

Japanese Office Action dated Mar. 1, 2022 for Japanese Patent Application No. 2018-043480.

* cited by examiner

FIG. 7

| PRINTER NAME: PRINTER_A | | | | | | |
|---|---|---|---|---|---|---|
| DATA ID | GROUP IDENTIFIER | USER IDENTIFIER | PRINTING INFORMATION NAME | THE NUMBER OF PRINTED SHEETS | STATE | PRINTING TIME |
| 00001 | Group_A | User_XXX | D_XXX | 5 | PRINTING | 3 MINUTES |
| 00002 | Group_A | User_YYY | D_YYY | 1 | IN PRINT QUEUE | 1 MINUTE |
| 00003 | Group_A | User_ZZZ | D_ZZZ | 2 | IN PRINT QUEUE | 2 MINUTES |
| ... | ... | ... | ... | ... | ... | ... |

FIG. 9

| DATA ID | GROUP IDENTIFIER | USER IDENTIFIER | DATA NAME | THE NUMBER OF PRINTED SHEETS | STATE | PRINTING END TIME |
|---|---|---|---|---|---|---|
| PRINTER NAME: PRINTER_A | | | | | | |
| 00001 | A | User_XXX | D_XXX | 5 | PRINTING COMPLETION | 02/06/2018 03:31:13 PM |
| 00002 | B | User_YYY | D_YYY | 1 | PRINTING COMPLETION | 02/07/2018 10:03:10 AM |
| ... | ... | ... | ... | ... | ... | ... |

FIG. 12

| PRINTER NAME: PRINTER_A | | | | | | |
|---|---|---|---|---|---|---|
| DATA ID | GROUP IDENTIFIER | USER IDENTIFIER | DATA NAME | THE NUMBER OF PRINTED SHEETS | STATE | PRINTING TIME |
| 00001 | A | User_XXX | D_XXX | 5 | PRINTING | |
| 00002 | A | User_XXX | D_XXX | 1 | IN PRINT QUEUE | |
| 00003 | B | User_YYY | D_YYY | 2 | IN PRINT QUEUE | |
| 00004 | A | User_XXX | D_XXX | 2 | IN PRINT QUEUE | |
| ... | ... | ... | ... | ... | ... | ... |

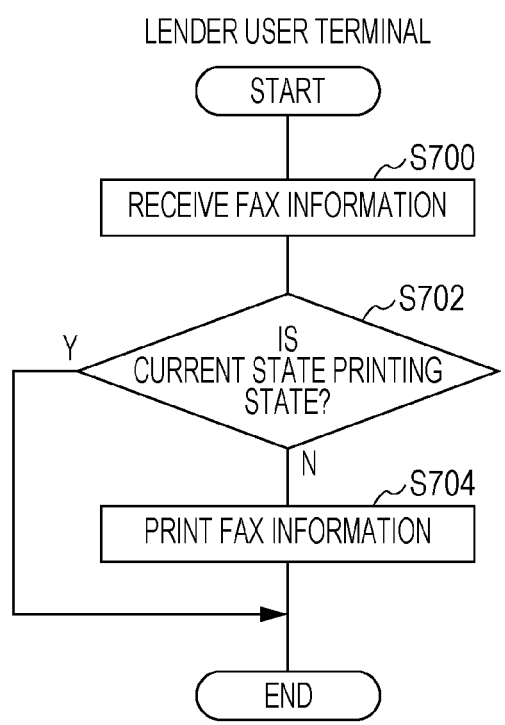

PREVENTING PRINT DATA FROM BEING TRANSMITTED WHEN PRINTER IS IN A BUSY STATE

CROSS-REFERENCE TO RELATED APPLICATIONS

This application is based on and claims priority under 35 USC 119 from Japanese Patent Application Nos. 2018-043480 filed Mar. 9, 2018 and 2018-043481 filed Mar. 9, 2018.

BACKGROUND

(i) Technical Field

The present disclosure relates to a printing controller apparatus, a printer, and a non-transitory computer readable medium.

(ii) Related Art

Japanese Unexamined Patent Application Publication No. 2017-159618 discloses an information processing apparatus which is provided with a specifying unit, an output control unit, and an event detecting unit. The specifying unit specifies an operator who inputs an output request for outputting an output object. The output control unit controls an output process for the output request. The event detecting unit detects an event likely to cause the operator to stop immediate output of the output request. If the output control unit is instructed from the operator to execute an immediate output process requested by the output request after the operator is specified, and if the event detecting unit detects the event even though the operator is specified, the output control unit stops the immediate output process of the output request.

Japanese Unexamined Patent Application Publication No. 2010-199838 discloses a printing system including a printer. The printing system includes a receiving unit, a queuing unit, a first judgment unit, a second judgment unit, a notification unit, and an execution unit. The receiving unit receives a print job generated in accordance with an operation from a user. The print job is assigned one of first and second modes. The first mode has an attribute for requesting immediate execution of printing independently of the other print jobs. The second mode has an attribute for requesting holding of execution of the printing until a predetermined condition is satisfied. The queuing unit queues the received print job. The first judgment unit judges a mode assigned to the queued print job. If the first mode is assigned to the queued print job, the second judgment unit judges whether the printing corresponding to the print job is available on the basis of a condition of a consumable needed for the printing. If the printing corresponding to the queued print job is judged to be unavailable, the notification unit makes notifications to an information processing apparatus as a source of the queued print job, the notifications respectively indicating that the printing is unavailable and that resupply or replacement of the consumable needed for the printing is needed. After the notifications by the notification unit, the second judgment unit again judges whether the printing corresponding to the print job is available. When the printing corresponding to the queued print job becomes available, the execution unit executes the printing corresponding to the queued print job.

Japanese Unexamined Patent Application Publication No. 2005-311884 discloses an image processing apparatus including a first board and a second board. The first board includes a controller that controls a process for printing data received from an external apparatus via an interface and also controls transition to an energy save mode under a predetermined condition and returning from the energy save mode. The second board executes a process for developing the printing data. The image processing apparatus is configured to be controlled by the controller in the following manner. The printing data received by the first board from the external apparatus is transferred to the second board, the image data having undergone a development process by the second board is received by the first board, and the received image data is printed by a recording unit. In the image processing apparatus, if the condition for transition to the energy save mode is satisfied, but if the first board or the second board has printing data or image data that is currently being processed or that is in a processing queue, the controller prohibits the transition to the energy save mode.

SUMMARY

Aspects of non-limiting embodiments of the present disclosure relate to a printing controller apparatus, a printer, and a non-transitory computer readable medium.

It is an object of the present disclosure to provide a printing controller apparatus, a printer, and a non-transitory computer readable medium that enable a printed material of a user different from an external user to be restrained from being printed in a time range for the printed material even in a case where a printer managed by a specific administrator is used by the external user.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a printing controller apparatus including a transmitting unit, a receiving unit, and a controller. The transmitting unit performs transmission of first printing information to a printer. The receiving unit receives state information indicating a state of the printer. The controller performs control of the transmitting unit to prohibit the transmission of the first printing information to the printer if the state information indicates a state in which second printing information different from the first printing information is currently being printed or a state in which the second printing information is to be printed.

BRIEF DESCRIPTION OF THE DRAWINGS

Exemplary embodiments of the present disclosure will be described in detail based on the following figures, wherein:

FIG. 7 is a table illustrating an example of state information;

FIG. 9 is a table illustrating an example of state information;

FIG. 12 is a table illustrating an example of printing-target information;

FIG. 15 is a sequence diagram illustrating the flow of a process executed by the apparatus according to a seventh exemplary embodiment.

DETAILED DESCRIPTION

Hereinafter, examples of exemplary embodiments of disclosed technology will be described with reference to the drawings.

First Exemplary Embodiment

Figure 1:
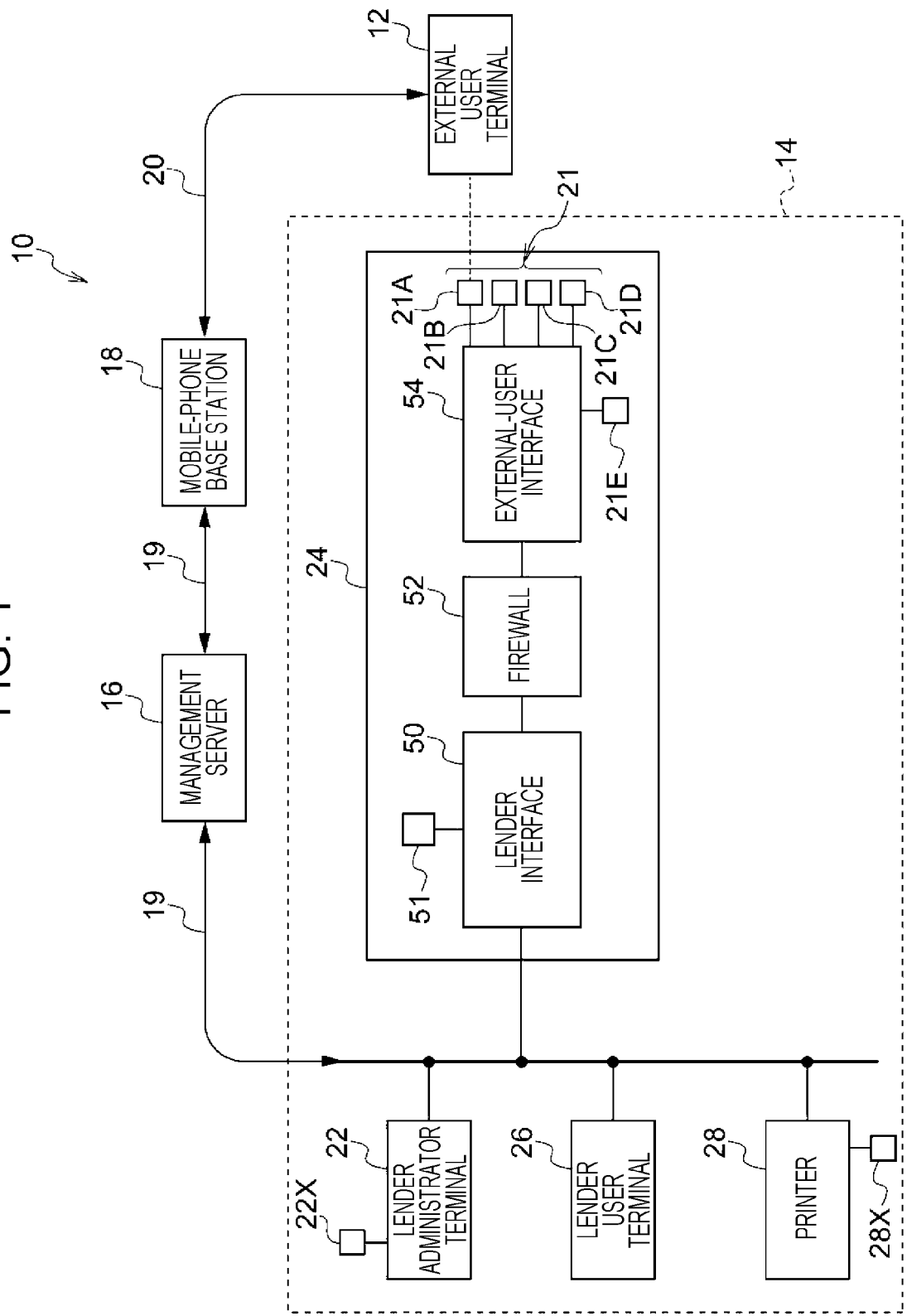
FIG. 1 is a schematic diagram illustrating an example configuration of a printing system according to each exemplary embodiment.

FIG. 1 is a diagram illustrating the schematic configuration of a printing system 10 in a first exemplary embodiment.

As illustrated in FIG. 1, the printing system 10 includes an external user terminal 12, a lender management system 14, and a management server 16. The lender management system 14, the management server 16, and a mobile-phone base station 18 are connected via a network 19 such as the Internet. The external user terminal 12 and the mobile-phone base station 18 are connected via a mobile-phone network 20. Note that the external user terminal 12 is connectable to the lender management system 14 via an external-connection access point 21. The external user terminal 12 is an example of a printing controller apparatus.

As illustrated in FIG. 1, the lender management system 14 includes a lender administrator terminal 22, a management apparatus 24, a lender user terminal 26, and a printer 28.

External User Terminal

Figure 2:
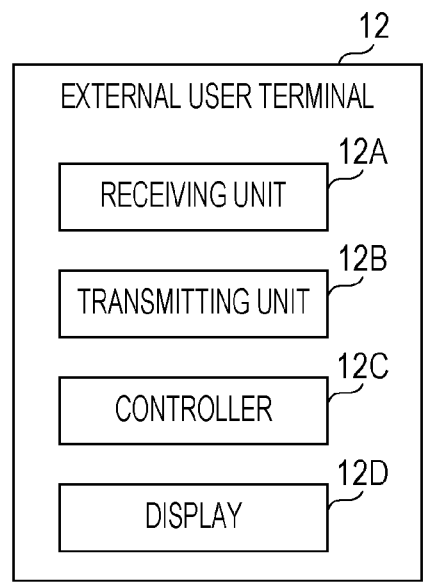
FIG. 2 is a block diagram illustrating an example configuration of an external user terminal according to the exemplary embodiment.

As illustrated in FIG. 2, the external user terminal 12 functionally includes a receiving unit 12A, a transmitting unit 12B, a controller 12C, and a display 12D.

The receiving unit 12A receives information transmitted from the printer 28. Specifically, the receiving unit 12A receives state information indicating the state of the printer 28.

The transmitting unit 12B transmits, to the printer 28, printing information that is information stored in a memory (not illustrated) of the external user terminal 12 and that indicates information regarding a printing target. The printing information to be transmitted from the external user terminal 12 to the printer 28 is an example of first printing information.

If the state information received by the receiving unit 12A indicates a state in which printing information different from the printing information to be transmitted from the external user terminal 12 to the printer 28 is currently being printed or is to be printed (hereinafter, referred to as a "printing state"), the controller 12C performs control of the transmitting unit 12B to prohibit the transmission of the printing information to the printer 28. The printing information different from the printing information to be transmitted from the external user terminal 12 to the printer 28 is an example of second printing information.

Specifically, if printing information with a different user identifier that is different from a user identifier of an external user is in the printing state, the controller 12C prohibits the transmission of the printing information to the printer 28.

The display 12D displays a display screen or the like under the control of the controller 12C. When the control of the transmitting unit 12B to prohibit the transmission of the printing information to the printer 28 is performed, the controller 12C performs control of the display 12D to cause the display 12D to indicate that the printing information of a different user is in the printing state.

Management Server

The management server 16 controls the use of the printer 28 in the lender management system 14 by the external user terminal 12.

Specifically, a lender administrator logs in the management server 16 by using the lender administrator terminal 22 and transmits the following information as administrator information.

(1) The name, the IP address, attribute information (such as usable sheet sizes and usable colors, (colors usable or only black and white usable)), the current state (usable or unusable), and the like of the printer 28

(2) The name and the IP address of the lender administrator terminal 22

(3) The name and the IP address of the management apparatus 24, and the lender management ID (identification) indicating identification information regarding the management apparatus 24

(4) The address or the location of the place where the printer 28 is installed (5) A formula for the rental fee of the printer 28

(6) A method, a credit card number, and the like of use fee payment from the management server 16 to the lender The external user operates the external user terminal 12, logs in the management server 16 via the mobile-phone network 20, and transmits the following information as user information.

(1) The name and the IP address of the external user terminal 12

(2) The user ID indicating identification information regarding the external user terminal 12

(3) The location information regarding the external user terminal 12

(4) Attribute information (such as sheet sizes, colors, and a duplex printing capability) of a printer intended to be used (5) A method, a credit card number, and the like of use fee payment from the external user to the management server 16

The management server 16 stores the administrator information and the user information in a memory (not illustrated) and manages the use of the printer 28 by the external user. For example, when the external user uses the printer 28, the management server 16 associates the user information with the administrator information and thereby manages charging on the basis of the use of the printer 28.

Lender Management System

Lender Administrator Terminal

The lender administrator terminal 22 is operated by the administrator of the lender management system 14. The lender administrator terminal 22 has a function of approving or rejecting the use of the printer 28, for example, through the external user terminal 12. Specifically, on the basis of approval or rejection of connection to the external user terminal 12 input by the administrator, the lender administrator terminal 22 manages the use of the printer 28 through the external user terminal 12. The lender administrator terminal 22 includes a fax port 22X.

A memory (not illustrated) of the lender administrator terminal 22 stores the following information.
(1) The management ID indicating information for identifying the management apparatus 24
(2) Information regarding a Wi-Fi (registered trademark) connection point 21A for an external user terminal
(3) Information regarding a Wi-Fi (registered trademark) connection point 51 for a lender user terminal Management Apparatus The management apparatus 24 manages communication between the external user terminal 12 and the printer 28. As illustrated in FIG. 1, the management apparatus 24 includes a lender interface 50, the Wi-Fi (registered trademark) connection point 51 for a lender user terminal, a firewall 52, an external-user interface 54, the Wi-Fi (registered trademark) connection point 21A for an external user terminal, a Bluetooth (registered trademark) point 21B for an external user terminal, a USB port 21C for an external user terminal, a wired LAN port 21D for an external user terminal, and a fax port 21E for an external user terminal. The lender interface 50 stores the management ID indicating the information for identifying the management apparatus 24. The firewall 52 allows information needed for a printing process to pass therethrough and does not allow unneeded information to pass therethrough. The security for the lender management system 14 and the external user terminal 12 is thus ensured.

Lender User Terminal

The lender user terminal 26 is a terminal operated by a lender user. For example, the lender user operates the lender user terminal 26 and thereby performs printing by using the printer 28.

Figure 3:
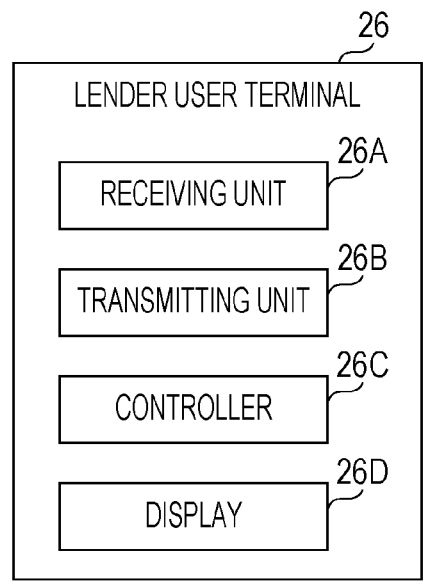
FIG. 3 is a block diagram illustrating an example configuration of a lender user terminal according to the exemplary embodiment.

As illustrated in FIG. 3, the lender user terminal 26 functionally includes a receiving unit 26A, a transmitting unit 26B, a controller 26C, and a display 26D.

The receiving unit 26A receives information transmitted from the printer 28. Specifically, the receiving unit 26A receives state information indicating the state of the printer 28.

The transmitting unit 26B transmits the printing information stored in a memory (not illustrated) of the lender user terminal 26 to the printer 28.

If the state information received by the receiving unit. 26A indicates the printing state of different printing information, the controller 26C performs control of the transmitting unit 26B to prohibit the transmission of the printing information to the printer 28.

Specifically, if printing information associated with a different user identifier that is different from the user identifier of the lender user is in the printing state, the controller 26C prohibits the transmission of the printing information to the printer 28.

The display 26D displays a display screen or the like under the control of the controller 26C. When performing the control of the transmitting unit 26B to prohibit the transmission of the printing information to the printer 28, the controller 26C performs control of the display 26D to cause the display 26D to indicate that the printing information of a different user is in the printing state.

Printer

The printer 28 is an apparatus that performs printing by using a known system such as an electrophotographic system or an inkjet system. The printer 28 has printing-related functions such as a printing function of forming an image on a recording medium such as paper, a scanning function of reading an image formed on a recording medium such as paper, and a copying function of reading an image formed on a recording medium such as paper and then forming the read image on a recording medium such as paper.

Figure 4:
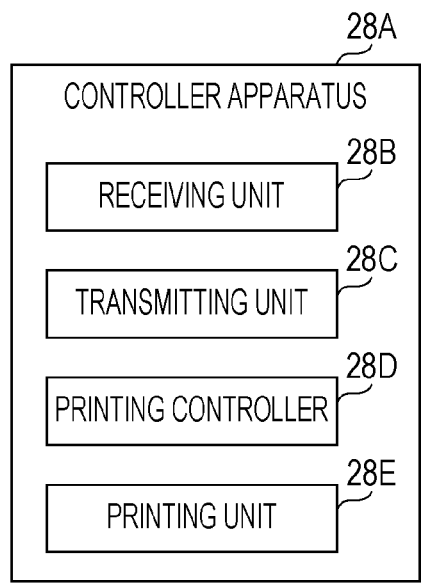
FIG. 4 is a block diagram illustrating an example configuration of a printer according to the exemplary embodiment.

As illustrated in FIG. 4, a controller apparatus 28A that controls the printer 28 functionally includes a receiving unit 28B, a transmitting unit 28C, a printing controller 28D, and a printing unit 28E. The receiving unit 28B is an example of a printing-information receiving unit. The printer 28 includes a fax port 28X for an external user terminal.

The receiving unit 28B of the printer 28 receives printing information transmitted from the lender user terminal 26 or the external user terminal 12.

The transmitting unit 28C of the printer 28 transmits information to a different apparatus.

When the receiving unit 28B receives the printing information, the printing controller 28D performs control of the printing unit 28E of the printer 28 to perform printing in accordance with the printing information.

Under the control of the printing controller 28D, the printing unit 28E prints the printing information received by the receiving unit 28B.

Figure 5:
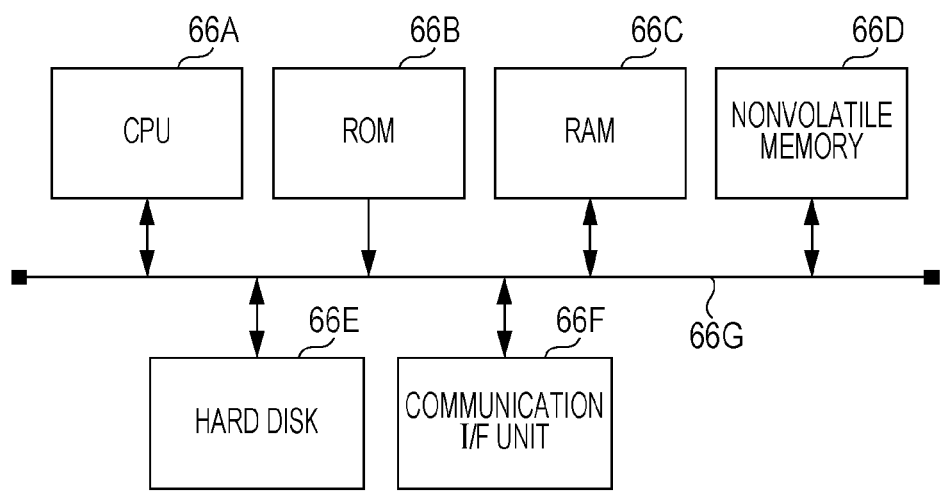
FIG. 5 is a configuration diagram illustrating the hardware configuration of each of the apparatuses.

FIG. 5 is a block diagram illustrating the hardware configuration of each of the external user terminal 12, the management server 16, the management apparatus 24, the lender administrator terminal 22, and the controller apparatus 28A of the printer 28.

The external user terminal 12, the management server 16, the management apparatus 24, the lender administrator terminal 22, and the controller apparatus 28A of the printer 28 each have a computer function and include a central processing unit (CPU) 66A, a read only memory (ROM) 66B, a random access memory (RAM) 66C, a nonvolatile memory 66D, a hard disk 66E, and a communication interface (I/F) unit 66F. The CPU 66A, the ROM 66B, the RAM 66C, the nonvolatile memory 66D, the hard disk 66E, and the communication interface unit 66F are connected to each other via a bus 66G.

The CPU 66A runs various programs and controls the components. When operating in this manner, the CPU 66A uses the RAM 66C as a work area to run a program.

The nonvolatile memory 66D is a memory in which the content of data is held even though a corresponding one of the management server 16, the management apparatus 24, the lender administrator terminal 22, and the controller apparatus 28A of the printer 28 is powered off.

The hard disk 66E stores, for example, programs (described later) and various pieces of information.

The communication interface unit 66F communicates with a different apparatus.

The flow of a printing management process executed by the printing system 10 will be described.

Figure 6:
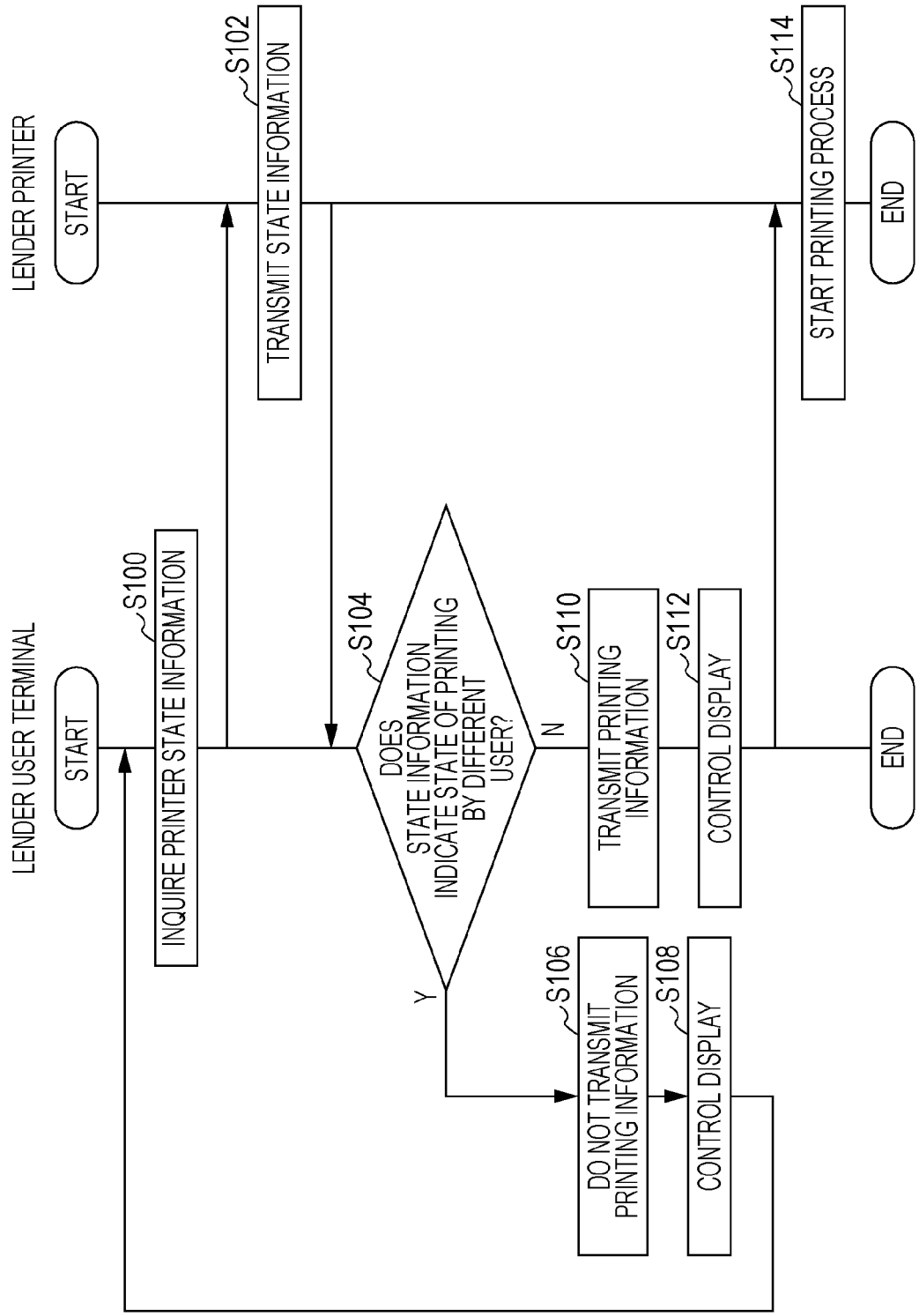
FIG. 6 is a sequence diagram illustrating the flow of a process executed by the apparatuses according to a first exemplary embodiment.

FIG. 6 is a sequence diagram illustrating the flow of a printing management process according to the first exemplary embodiment.

The external user terminal 12 performs processing in such a manner that the CPU (not illustrated) loads a program from the hard disk (not illustrated). The management server 16 performs processing in such a manner that the CPU (not illustrated) loads a program from the hard disk (not illustrated).

The lender administrator terminal 22 performs processing in such a manner that the CPU (not illustrated) loads a program from the hard disk (not illustrated). The management apparatus 24 performs processing in such a manner that the CPU (not illustrated) loads a program from the hard disk (not illustrated). The controller 28A that controls the printer 28 performs processing in such a manner that the CPU (not illustrated) loads a program from the hard disk (not illustrated).

The external user performs an operation for user registration in the management server 16 by using the external user terminal 12 and is permitted to use the printer 28. In this case, the external user terminal 12 and the lender user terminal 26 may use the printer 28 in the lender management system 14. The following process will be described by taking a case where the lender user performs printing by using the printer 28 as an example.

In step S100, under the control of the controller 26C, the transmitting unit 12B of the lender user terminal 26 transmits a request signal indicating a request for state information regarding the printer 28.

In step S102, the receiving unit 28B of the printer 28 receives the request signal transmitted from the lender user terminal 26 in step S100 described above. In step S102, the transmitting unit 28C of the printer 28 transmits the state information regarding the printer 28 to the lender user terminal 26.

FIG. 7 illustrates an example of the state information. As illustrated in FIG. 7, the state information is information in which a data ID indicating the identification information of printing information, a group identifier indicating a group to which a user belongs, a user identifier indicating the user, the name of the printing information, the number of printed sheets at the time of printing the printing information, the state of the printer 28, and printing time to be taken to print the printing information are associated with each other. For example, group identifiers are assigned to an administrator user and an external user, respectively. In addition, for example, as illustrated in FIG. 7, the printing information with the data ID "00001" is printing information transmitted from a terminal with the user identifier "User_XXX".

In step S104, the transmitting unit 12B of the lender user terminal 26 receives the state information transmitted from the printer 28 in step S102 described above. In step S104, the controller 26C of the lender user terminal 26 judges whether the state information received by the receiving unit 26A indicates the printing state. Specifically, the controller 26C of the lender user terminal 26 judges whether printing information of a different user is in the printing state in the printer 28.

For example, as illustrated in FIG. 7, if the printing information with the user identifier "User_XXX" is included in the state information, and if the identifier of the user of the lender user terminal 26 is "User_WWW", the controller 26C judges that the printing information of a different user is in the printing state.

If the printing information of a different user is in the printing state, the controller 26C proceeds to step S106. In contrast, if the printing information of a different user is not in the printing state, the controller 26C proceeds to step S110.

In step S106, the controller 26C performs control of the transmitting unit 26B to prohibit the transmission of the printing information to the printer 28. That is, the controller 26C does not transmit the printing information to the printer 28.

In step S108, under the control of the controller 26C, the display 26D indicates that the printing information of a different user is in the printing state. For example, the display 26D displays such a message "Waiting for completion of printing by different user".

In step S110, the controller 26C performs control of the transmitting unit 26B to transmit the printing information to the printer 28.

In step S112, under the control of the controller 26C, the display 26D indicates that the printing information is to be transmitted to the printer 28. For example, the display 26D displays such a message "Printing information will be transmitted".

In step S114, the receiving unit 28B of the printer 28 receives the printing information transmitted from the lender user terminal 26. In step S114, if the receiving unit 28B receives the printing information, the printing controller 28D performs control of the printing unit 28E of the printer 28 to perform printing in accordance with the printing information. The printing process by the printer 28 is then terminated.

In this exemplary embodiment as described above, if the state information indicating the state of the printer indicates the printing state of the printing information associated with a different user, the transmission of the printing information to the printer is prohibited.

In the first exemplary embodiment, the case where the control is performed to prohibit the transmission of the printing information to the printer 28 if the printing information of a different user is in the printing state in the printer 28 has been described taken as an example. However, the exemplary embodiment is not limited to this case. For example, if the printer 28 is simply in the printing state, the control of the transmitting unit 26B may be performed to prohibit the transmission of the printing information to the printer 28.

In addition, each of user identifiers of the corresponding user may be set to belong to one of predetermined groups, and the transmission of printing information may be prohibited on the basis of the group to which the user identifier belongs. Specifically, if the printing information with a different user identifier belongs to a different group that is different from the group to which the user identifier in the printing information as a transmission target belongs, and if the printing information with a different user identifier is in the printing state, the transmission of the printing information may be prohibited. In this case, for example, a group of the lender user and a group of the external user are set in advance as groups different from each other. In addition, for example, if multiple external users use the printer, multiple groups different from each other are set for the external users.

In addition, when the transmission of the printing information is prohibited on the basis of the group to which the user identifier belongs, the display 26D may indicate that the printing information of a different user belonging to the different group is in the printing state.

The process executed by the lender user terminal 26 has heretofore been described in the first exemplary embodiment. The process executed by the external user terminal 12 is the same as the above described process.

Second Exemplary Embodiment

A second exemplary embodiment of the disclosure will be described. The same components as those in the first exemplary embodiment are denoted by the same reference numerals, and detailed description is omitted.

The second exemplary embodiment is different from the first exemplary embodiment in that if a predetermined time has not elapsed since the completion of a printing process for a different user, control is performed not to transmit printing information from the external user terminal 12 or the lender user terminal 26 to the printer 28.

Figure 8:
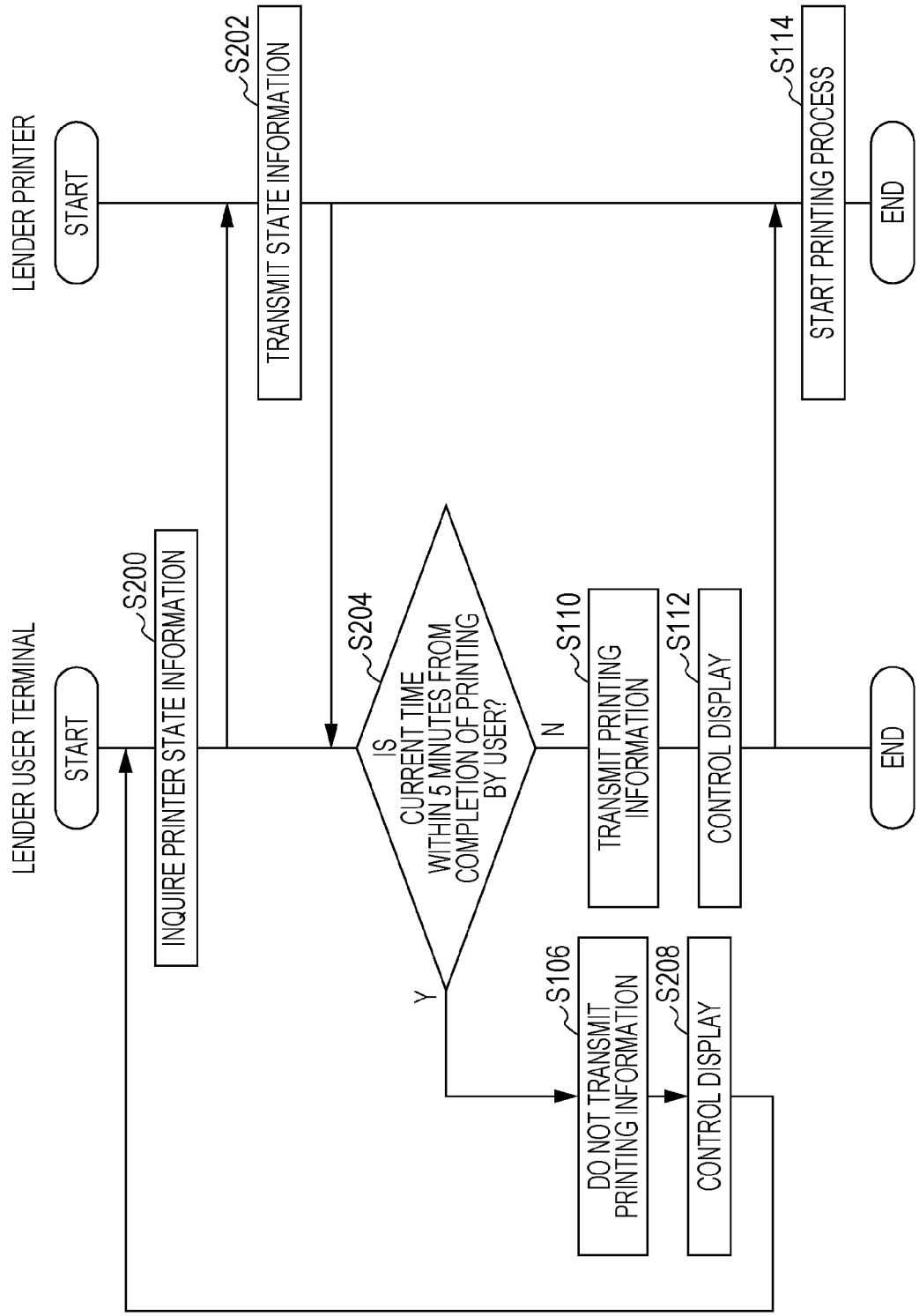
FIG. 8 is a sequence diagram illustrating the flow of a process executed by the apparatuses according to a second exemplary embodiment.

FIG. 8 is a sequence diagram illustrating the flow of a printing management process according to the second exemplary embodiment.

In step S200, under the control of the controller 26C, the transmitting unit 12B of the lender user terminal 26 transmits a request signal indicating a request for state information regarding the printer 28. The state information in the second exemplary embodiment includes time when printing is performed by the printer 28 most recently and a user identifier in the most recently printed printing information.

In step S202, the receiving unit 28B of the printer 28 receives the request signal transmitted from the lender user terminal 26 in step S200 described above. In step S202, the transmitting unit 28C of the printer 28 transmits the state information regarding the printer 28 to the lender user terminal 26.

FIG. 9 illustrates an example of the state information. As illustrated in FIG. 9, the state information is information in which a data ID indicating the identification information of printing information, a group identifier indicating a group to which a user belongs, a user identifier indicating the user, the name of the printing information, the number of printed sheets at the time of printing the printing information, the state of the printer 28, and a printing end time indicating time when printing of the printing information is completed are associated with each other.

In step S204, the transmitting unit 12B of the lender user terminal 26 receives the state information transmitted from the printer 28 in step S202 described above. In step S204, on the basis of the state information received by the receiving unit 26A, the controller 26C of the lender user terminal 26 judges whether the current time is within a predetermined range from the time when the printing is performed most recently and whether the user identifier in the most recently printed printing information is the user identifier of a different user.

For example, the example illustrated in FIG. 9 proves that the printing information with the user identifier "User_YYY" is printed most recently.

If the current time is within the predetermined range from the time when the printing is performed most recently, and if the user identifier in the most recently printed printing information is the user identifier of a different user, the controller 26C proceeds to step S106. In contrast, if the time when the printing is performed most recently is not within the predetermined range, or if the user identifier in the most recently printed printing information is not the user identifier of a different user, the controller 26C proceeds to step S110.

In step S208, under the control of the controller 26C, the display 26D indicates that the predetermined time has not been elapsed since the printing information of a different user is printed. For example, the display 26D displays such a message "Waiting for elapse of five minutes after completion of printing by different user".

In the second exemplary embodiment as described above, if the current time is within the predetermined range from the time when the printing is performed by the printer most recently, and if the user identifier in the most recently printed printing information is the user identifier of a different user, the transmission of printing information to the printer is prohibited.

In the second exemplary embodiment, the following case has been described taken as an example. Specifically, if the current time is within the predetermined range from the time when the printing is performed by the printer most recently, and if the user identifier in the most recently printed printing information is the user identifier of a different user, the transmission of printing information to the printer is prohibited. However, the exemplary embodiment is not limited to this case. For example, the control of the transmitting unit 26B may be performed to prohibit the transmission of the printing information to the printer 28 if the current time is within the predetermined range from the time when the printing is performed by the printer 28 most recently.

In addition, each user identifier of the corresponding user may be set to belong to one of predetermined groups, and the transmission of printing information may be prohibited on the basis of the group to which the user identifier belongs. Specifically, if the current time is within the predetermined range from the time when the printing is performed by the printer most recently, and if a group to which a user identifier in the most recently printed printing information is a different group that is different from a group to which a user identifier in printing information as a transmission target belongs, the transmission of the printing information may be prohibited.

Third Exemplary Embodiment

A third exemplary embodiment of the disclosure will be described. The same components as those in the first or second exemplary embodiment are denoted by the same reference numerals, and detailed description is omitted.

The third exemplary embodiment is different from the first and second exemplary embodiments in that if the operation state of the printer 28 is a normal state, and if a printing process for a different user is complete, control is performed not to transmit printing information from the external user terminal 12 or the lender user terminal 26 to the printer 28.

Figure 10:
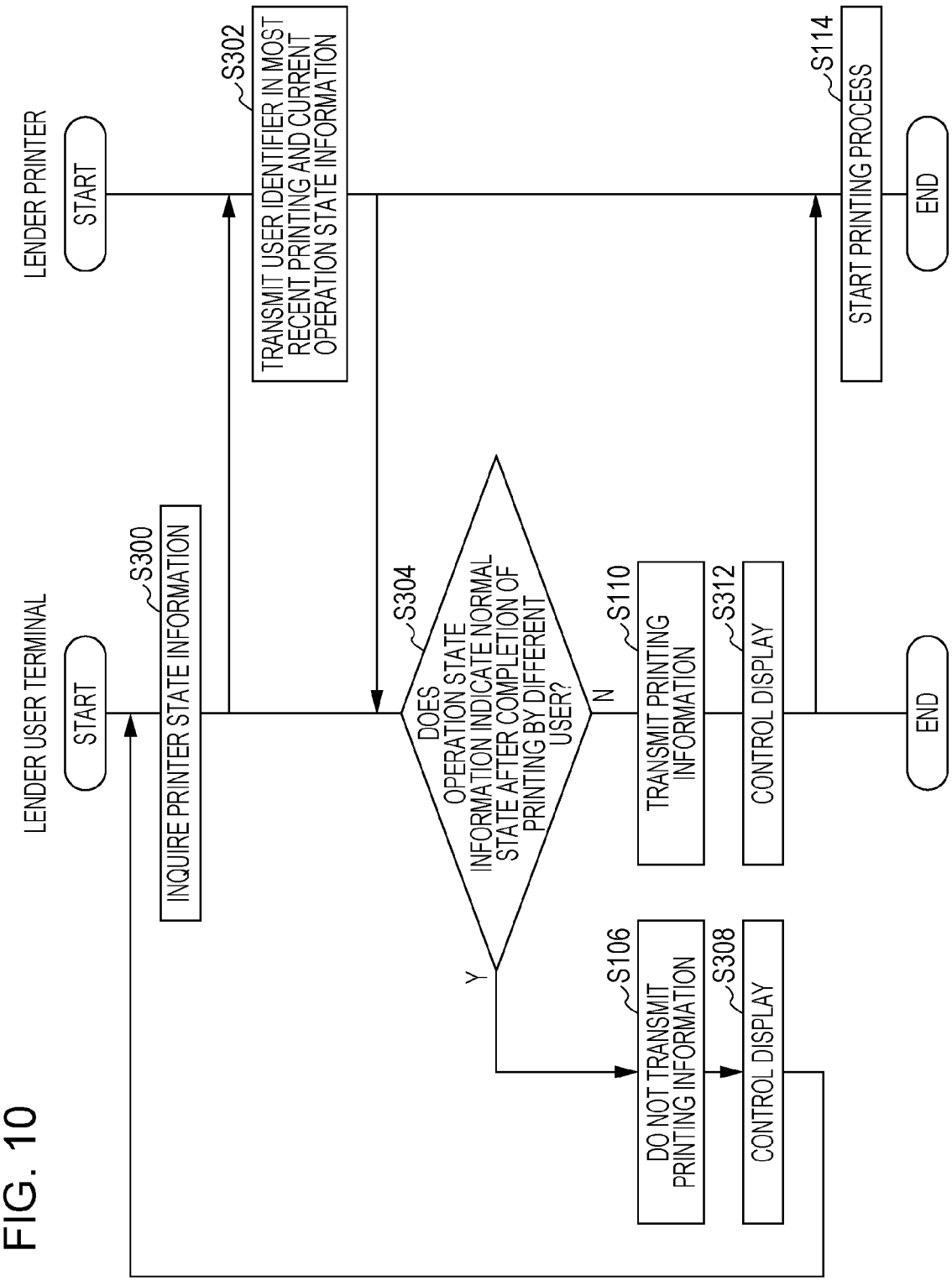
FIG. 10 is a sequence diagram illustrating the flow of a process executed by the apparatuses according to a third exemplary embodiment.

FIG. 10 is a sequence diagram illustrating the flow of a printing management process according to the third exemplary embodiment.

In step S300, under the control of the controller 26C, the transmitting unit 12B of the lender user terminal 26 transmits a request signal indicating a request for operation state information regarding the printer 28 and a user identifier in the most recently printed printing information. The operation state information is information indicating one of the normal state denoting availability of printing by the printer 28 and a power save state denoting power consumption lower than that in the normal state.

In step S302, the receiving unit 28B of the printer 28 receives the request signal transmitted from the lender user terminal 26 in step S300 described above. In step S302, the transmitting unit 28C of the printer 28 transmits the operation state information regarding the printer 28 and the user identifier in the most recently printed printing information to the lender user terminal 26.

In step S304, the transmitting unit 12B of the lender user terminal 26 receives the operation state information and the user identifier in the most recently printed printing information that are transmitted from the printer 28 in step S302 described above. In step S304, the controller 26C of the lender user terminal 26 judges whether the operation state information indicates the normal state and whether the user identifier in the most recently printed printing information is the user identifier of a different user.

If the operation state information indicates the normal state, and if the user identifier in the most recently printed printing information is the user identifier of a different user, the controller 26C proceeds to step S106. In contrast, if the operation state information does not indicate the normal state, or if the user identifier in the most recently printed printing information is not the user identifier of a different user, the controller 26C proceeds to step S110. Note that the case where the operation state information does not indicate the normal state denotes a case where the operation state information indicates the power save state.

In step S308, under the control of the controller 26C, the display 26D indicates that the state of the printer 28 has not been changed to the power save state after the printing of the printing information of a different user. For example, the display 26D displays such a message "Waiting for transition to power save state after completion of printing by different user".

In the third exemplary embodiment as described above, if the operation state information regarding the printer indicates the normal state, and if a user identifier in the most recently printed printing information is the user identifier of a different user, the transmission of printing information to the printer is prohibited.

In the third exemplary embodiment, the following case has been described taken as an example. Specifically, if the operation state information regarding the printer indicates the normal state, and if a user identifier in the most recently printed printing information is the user identifier of a different user, the transmission of printing information to the printer is prohibited. However, the exemplary embodiment is not limited to this case. For example, if the operation state information regarding the printer 28 simply indicates the normal state, the control of the transmitting unit 26B may be performed to prohibit the transmission of the printing information to the printer 28.

In addition, each user identifier of the corresponding user may be set to belong to one of predetermined groups, and the transmission of printing information may be prohibited on the basis of the group to which the user identifier belongs. Specifically, if the operation state information regarding the printer indicates the normal state, and if a group to which a user identifier in the most recently printed printing information belongs is a different group that is different from a group to which a user identifier in printing information as a transmission target belongs, the transmission of the printing information to the printer may be prohibited.

Fourth Exemplary Embodiment

A fourth exemplary embodiment of the disclosure will be described. The same components as those in the first to third exemplary embodiments are denoted by the same reference numerals, and detailed description is omitted.

In the fourth exemplary embodiment, after printing information is transmitted from the external user terminal 12 or the lender user terminal 26 to the printer 28, the printer 28 performs control of whether to print the printing information. Specifically, the fourth exemplary embodiment is different from the first to third exemplary embodiments in that the printer 28 is controlled to continuously print pieces of printing information of the same user.

Figure 11:
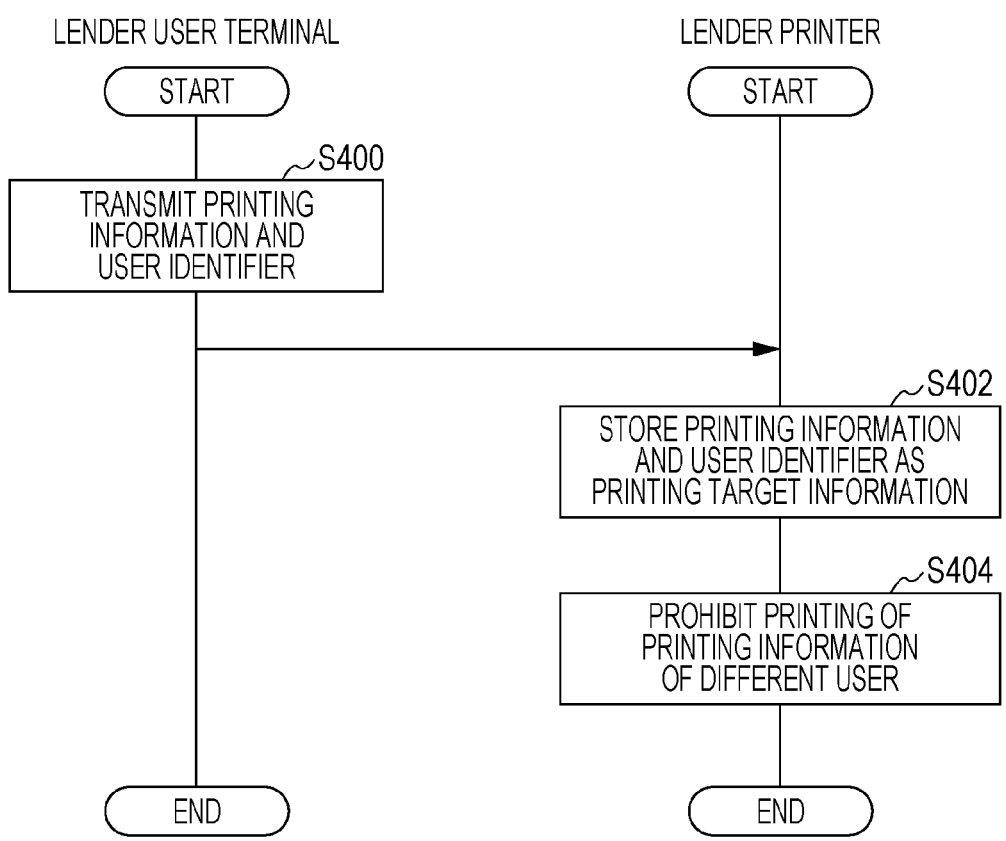
FIG. 11 is a sequence diagram illustrating the flow of a process executed by the apparatuses according to a fourth exemplary embodiment.

FIG. 11 is a sequence diagram illustrating the flow of a printing management process according to the fourth exemplary embodiment.

In step S400, the transmitting unit 12B of the lender user terminal 26 transmits printing information and a user identifier to the printer 28 under the control of the controller 26C.

In step S402, the receiving unit 28B of the printer 28 receives the printing information and the user identifier transmitted from the lender user terminal 26 in step S400 described above. In step S402, the printing controller 28D of the printer 28 stores the printing information and the user identifier as printing-target information in a memory (not illustrated).

FIG. 12 illustrates an example of the printing-target information. For example, FIG. 12 includes the user identifier "User_XXX" of an external user and the user identifier "User_YYY" of a lender user.

In step S404, the printing controller 28D of the printer 28 performs control of the printing unit 28E on the basis of the printing-target information in the memory (not illustrated) to prohibit printing of printing information with a different user identifier that is different from the user identifier in the printing information currently being printed or most recently printed. That is, the printing controller 28D of the printer 28 performs control of the printing unit 28E to continuously print pieces of the printing information of the same user.

In the fourth exemplary embodiment as described above, the printing information with a different user identifier that is different from the user identifier in the printing information currently being printed or most recently printed is prohibited from being printed on the basis of the printing information and the user identifier in the printing information.

In the fourth exemplary embodiment, the case where the printing of the printing information with a different user identifier is prohibited has been described taken as an example, the different user identifier being different from the user identifier in the printing information currently being printed or most recently printed. However, the exemplary embodiment is not limited to this case. For example, each user identifier of the corresponding user may be set to belong to one of predetermined groups, and the printing of the printing information may be prohibited on the basis of the group to which the user identifier belongs. Specifically, printing of printing information with a user identifier belonging to a different group may be prohibited, the different group being different from a group to which a user identifier in the printing information currently being printed or most recently printed belongs.

Fifth Exemplary Embodiment

A fifth exemplary embodiment of the disclosure will be described. The same components as those in the first to fourth exemplary embodiments are denoted by the same reference numerals, and detailed description is omitted.

The fifth exemplary embodiment is different from the first to fourth exemplary embodiments in that the printer 28 is controlled to continuously print printing information of the same user as a user in the most recently printed printing information.

Figure 13:
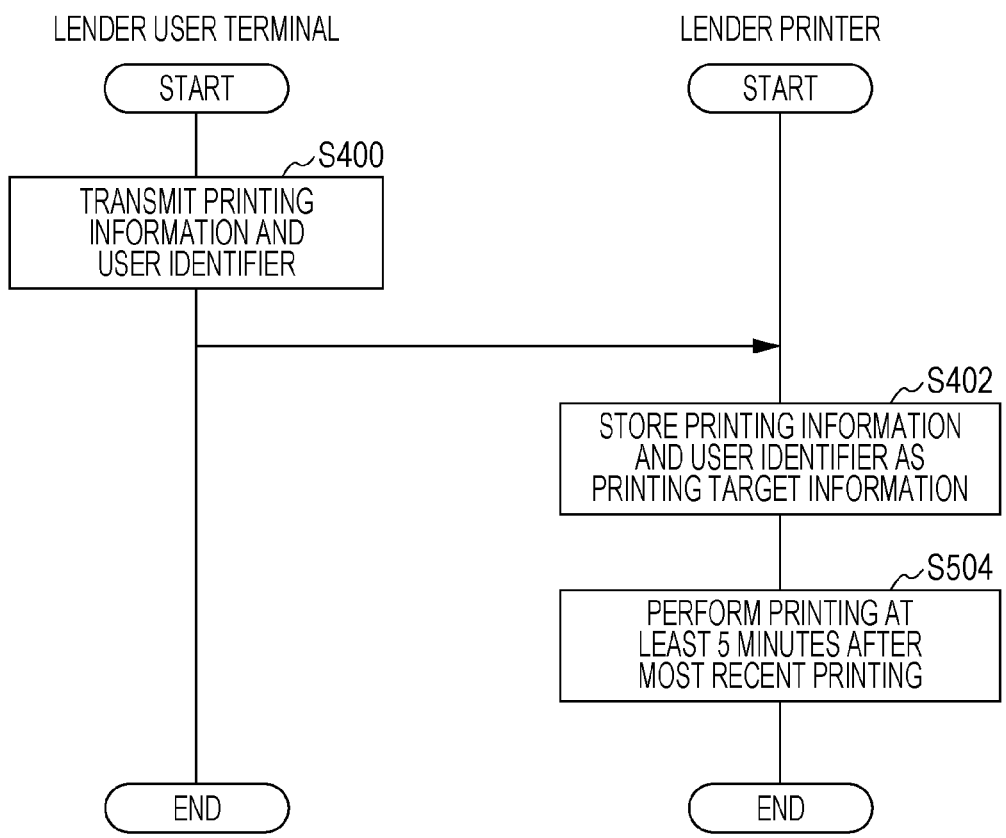
FIG. 13 is a sequence diagram illustrating the flow of a process executed by the apparatuses according to a fifth exemplary embodiment.

FIG. 13 is a sequence diagram illustrating the flow of a printing management process according to the fifth exemplary embodiment.

In step S504, if the current time is within a predetermined range (for example, within five minutes) from time when printing is performed by the printer 28 most recently, the printing controller 28D of the printer 28 performs control of the printing unit 28E on the basis of the printing-target information in the memory (not illustrated) to prohibit the printing of printing information with a different user identifier, the different user identifier being different from a user identifier in the most recently printed printing information. That is, if a predetermined time has elapsed since printing information of a user is printed, the printing controller 28D of the printer 28 performs control of the printing unit 28E to print printing information of a different user different from the user.

In the fifth exemplary embodiment as described above, if the current time is within the predetermined range from the time when the printing is performed by the printer most recently, the printing information with a different user identifier that is different from the user identifier in the most recently printed printing information is prohibited from being printed.

In the fifth exemplary embodiment, the following case has been described taken as an example. Specifically, if the current time is within the predetermined range from the time when the printing is performed by the printer most recently, the printing information with a different user identifier that is different from the user identifier in the most recently printed printing information is prohibited from being printed. However, the exemplary embodiment is not limited to this case. For example, each user identifier of the corresponding user may be set to belong to one of predetermined groups, and printing of printing information may be prohibited on the basis of the group to which the user identifier belongs. Specifically, if the current time is within the predetermined range from the time when the printing is performed by the printer most recently, printing of printing information with a different user identifier belonging to a different group may be prohibited, the different group being different from a group to which a user identifier in the printing information currently being printed or most recently printed belongs.

Sixth Exemplary Embodiment

A sixth exemplary embodiment of the disclosure will be described. The same components as those in the first to fifth exemplary embodiments are denoted by the same reference numerals, and detailed description is omitted.

The sixth exemplary embodiment is different from the first to fifth exemplary embodiments in that the printing unit 28E is controlled to wait until the printer 28 becomes in the power save state and then to print printing information.

Figure 14:
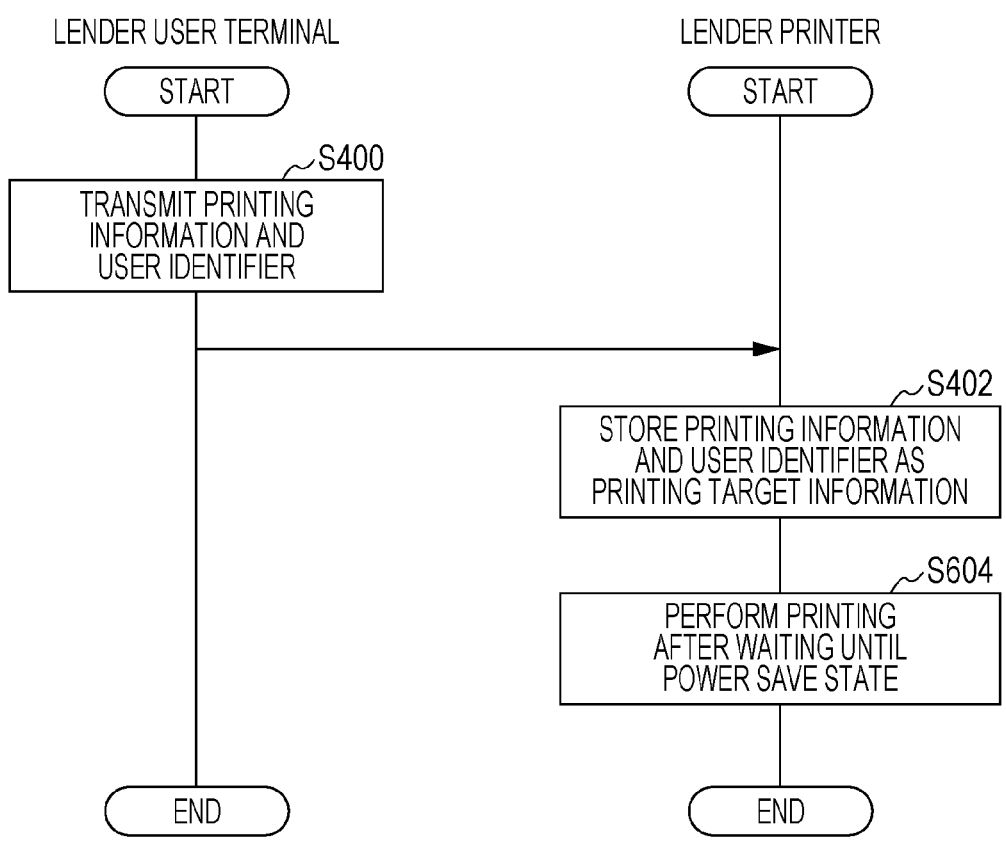
FIG. 14 is a sequence diagram illustrating the flow of a process executed by the apparatuses according to a sixth exemplary embodiment.

FIG. 14 is a sequence diagram illustrating the flow of a printing management process according to the sixth exemplary embodiment.

In step S604, if the operation state information regarding the printer 28 indicates the normal state, the printing controller 28D of the printer 28 performs control of the printing unit 28E on the basis of the printing-target information in the memory (not illustrated) to prohibit the printing of the printing information. In other words, if the current operation state information regarding the printer 28 indicates the power save state, the printing controller 28D of the printer 28 performs the control of the printing unit 28E to print the printing information.

In the sixth exemplary embodiment as described above, if the operation state information regarding the printer indicates the normal state, the printing of the printing information is prohibited.

Seventh Exemplary Embodiment

A seventh exemplary embodiment of the disclosure will be described. The same components as those in the first to sixth exemplary embodiments are denoted by the same reference numerals, and detailed description is omitted.

The seventh exemplary embodiment is different from the first to sixth exemplary embodiments in that if the printer 28 is in the printing state when the printer 28 receives fax information, control of the printing unit 28E is performed to prohibit the printing of the received fax information. Note that the fax information is an example of printing information.

FIG. 15 is a sequence diagram illustrating the flow of a printing management process according to the seventh exemplary embodiment.

In step S700, the receiving unit 28B of the printer 28 receives fax information transmitted from a different apparatus.

In step S702, the printing controller 28D of the printer 28 judges whether the current state of the printer 28 is the printing state. If the current state of the printer 28 is the printing state, the printing controller 28D of the printer 28 performs control of the printing unit 28E to prohibit the printing of the fax information received in step S700 described above. That is, the printing controller 28D of the printer 28 terminates the process without printing the fax information received in step S700 described above. In contrast, if the current state of the printer 28 is not the printing state, the printing controller 28D of the printer 28 proceeds to step S704.

In step S704, the printing controller 28D of the printer 28 performs control of the printing unit 28E to print the fax information received in step S700 described above.

In the seventh exemplary embodiment as described above, if the operation state of the printer is the normal state, the printing of the fax information that is an example of the printing information is prohibited.

The present disclosure has heretofore been described by using the exemplary embodiments, but the scope of the present disclosure is not limited to the scope of the exemplary embodiments. Various modifications and improvements may be made to the exemplary embodiments without departing from the spirit of the present disclosure, and a modified or improved mode may also be included in the technical scope of the present disclosure.

For example, in each of the fourth to sixth exemplary embodiments, the case where the printing of the printing information is prohibited if the predetermined condition is not satisfied has been described taken as an example. However, the exemplary embodiment is not limited to this case. For example, if the predetermined condition is not satisfied, control of the receiving unit may be performed not to receive new printing information. In this case, for example, if printing information of a user belonging to a group is currently being printed or to be printed, the control may be performed not to receive printing information transmitted from the terminal of a user belonging to a different group that is different from the group.

In the above-described fifth exemplary embodiment, the following case has been described taken as an example. Specifically, if the printing information of a user is printed, and if the predetermined time has elapsed, the control of the printing unit is performed to print the printing information of a different user different from the user. However, the exemplary embodiment is not limited to this case. For example, instead of waiting until the predetermined time elapses, waiting may be performed until the state of the printer becomes the power save state, and printing may be performed after the state of the printer becomes the power save state.

The control in each of the above-described first to seventh exemplary embodiments may be performed by the management server 16 or the management apparatus 24.

In the above-described first to seventh exemplary embodiments, which piece of printing information is to be preferentially printed to perform control may be determined. For example, if there are printing information transmitted from the external user terminal 12 and printing information transmitted from the lender user terminal 26, control may be performed to preferentially print the printing information transmitted from the external user terminal 12.

In each of the above-described first to third exemplary embodiments, the following case has been described taken as an example. Specifically, the external user terminal 12 or the lender user terminal 26 receives the state information or the like from the printer 28 and determines whether to transmit the printing information. However, the exemplary embodiment is not limited to this case. For example, the following control may be performed. Specifically, a user (or a group) identifier is transmitted from a terminal to the printer 28. The printer 28 judges whether to transmit printing information on the basis of the received user identifier and transmits the judgment result to the terminal. The external user terminal 12 or the lender user terminal 26 then receives the judgment result. If the judgment result indicates that the printing information may be transmitted, the printing information is transmitted to the printer 28.

In the exemplary embodiments, the cases where the printing function is used have been respectively described taken as examples. However, the external user may use different functions. That is, by using the printer, the external user may perform operations for copying a paper document, scanning a paper document, and transmitting image data resulting from the scanning to the external user terminal.

Although the case where the programs are in advance installed in the hard disk 66E has heretofore been described in each exemplary embodiment, the present disclosure is not limited to this case. For example, the programs may be provided in such a manner as to be stored in a storage medium such as a compact disk read only memory (CD-ROM) or through a network.

Further, the case where the programs are run and thereby the processes are implemented by using a computer and software configuration thereof has heretofore been described in each exemplary embodiment; however, the present disclosure is not limited to this case. For example, the processes may be implemented by the hardware configuration or combination of the hardware configuration and the software configuration.

The configuration of the apparatuses described in each exemplary embodiment is an example. Without departing from the spirit of the present disclosure, an unneeded component may be removed, and a new component may be added.

The flow of each process executed by the program described in the corresponding exemplary embodiment is an example. Without departing from the spirit of the present disclosure, an unneeded step may be removed, a new step may be added, and the order of steps may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A printing controller apparatus comprising:
 a first transmitting unit that performs transmission of first printing information jobs to a printer;
 a receiving unit that receives, for each of a plurality of requests to transmit the first printing information jobs to the printer, state information indicating a state of the printer prior to a determination being made of whether or not a corresponding first printing information job is to be transmitted to the printer; and
 a controller configured to:
  determine, for each of the plurality of requests, whether or not to transmit the corresponding first printing information job to the printer; and
  control the first transmitting unit to prohibit the transmission of the corresponding first printing information job to the printer without prompting a user to cancel the first printing information job, if the state information indicates a state in which a second printing information job, different from the corresponding first printing information job, is currently being printed or a state in which the second printing information job is to be printed,
 wherein the second printing information job is transmitted from a second transmitting unit different from the first transmitting unit,
 if the state information indicates the state in which the second printing information job is currently being printed or the state in which the second printing information job is to be printed, the second printing information job being associated with a user identifier that is a different user identifier different from a user identifier associated with the first printing information job, the controller controls the first transmitting unit to prohibit the transmission of the first printing information job to the printer, and
 the user identifiers each belong to one of a plurality of groups that are predetermined and if the state information indicates the state in which the second printing information job is currently being printed or the state in which the second printing information job is to be printed, the second printing information job being associated with the different user identifier belonging to the group that is a different group and that is different from the group to which the user identifier in the first printing information job belongs, the controller controls the first transmitting unit to prohibit the transmission of the first printing information job.

2. The printing controller apparatus according to claim 1, wherein when the controller controls the first transmitting unit to prohibit the transmission of the first printing information job to the printer, the controller controls a display to cause the display to indicate the state in which the second printing information job associated with the different user identifier is currently being printed or the state in which the second printing information job is to be printed.

3. The printing controller apparatus according to claim 1, wherein when the controller controls the first transmitting unit to prohibit the transmission of the first printing information job to the printer, the controller controls a display to cause the display to indicate the state in which the second printing information job associated with the different user identifier belonging to the different group is currently being printed or the state in which the second printing information job is to be printed.

4. A non-transitory computer readable medium storing a program causing a computer included in a printing controller apparatus to execute a process for controlling printing, the process comprising:
- performing transmission of first printing information jobs to a printer from a first transmitting unit;
- receiving, for each of a plurality of requests to transmit the first printing information jobs to the printer, state information indicating a state of the printer prior to a determination being made of whether or not a corresponding first printing information job is to be transmitted to the printer;
- determining, for each of the plurality of requests, whether or not to transmit the corresponding first printing information job to the printer; and
- controlling the first transmitting unit to prohibit the transmission of the corresponding first printing information job from the first transmission unit to the printer without prompting a user to cancel the first printing information job, if the state information indicates a state in which a second printing information job, different from the corresponding first printing information job, is currently being printed or a state in which the second printing information job is to be printed, wherein the second printing information job is transmitted from a second transmitting unit different from the first transmitting unit, if the state information indicates the state in which the second printing information job is currently being printed or the state in which the second printing information job is to be printed, the second printing information job being associated with a user identifier that is a different user identifier different from a user identifier associated with the first printing information job, the controller controls the first transmitting unit to prohibit the transmission of the first printing information job to the printer, and the user identifiers each belong to one of a plurality of groups that are predetermined and if the state information indicates the state in which the second printing information job is currently being printed or the state in which the second printing information job is to be printed, the second printing information job being associated with the different user identifier belonging to the group that is a different group and that is different from the group to which the user identifier in the first printing information job belongs, the controller controls the first transmitting unit to prohibit the transmission of the first printing information job.

* * * * *